US011645390B2

United States Patent
Vijayvargiya et al.

(10) Patent No.: US 11,645,390 B2
(45) Date of Patent: May 9, 2023

(54) CLOUD-BASED METHOD TO INCREASE INTEGRITY OF A NEXT GENERATION ANTIVIRUS (NGAV) SECURITY SOLUTION IN A VIRTUALIZED COMPUTING ENVIRONMENT

(71) Applicant: VMWARE, INC., Palo Alto, CA (US)

(72) Inventors: Shirish Vijayvargiya, Pune (IN); Vasantha Kumar Dhanasekar, Pune (IN); Sachin Shinde, Pune (IN); Rayanagouda Bheemanagouda Patil, Pune (IN)

(73) Assignee: VMWARE, INC., Palo Alto, CA (US)

( * ) Notice: Subject to any disclaimer, the term of this patent is extended or adjusted under 35 U.S.C. 154(b) by 272 days.

(21) Appl. No.: 16/871,088

(22) Filed: May 11, 2020

(65) Prior Publication Data
US 2021/0286877 A1    Sep. 16, 2021

(30) Foreign Application Priority Data

Mar. 16, 2020    (IN) ............................ 202041011229

(51) Int. Cl.
| G06F 21/56 | (2013.01) |
| G06F 11/30 | (2006.01) |
| G06F 9/455 | (2018.01) |
| G06F 21/60 | (2013.01) |

(52) U.S. Cl.
CPC ........ *G06F 21/566* (2013.01); *G06F 9/45558* (2013.01); *G06F 11/301* (2013.01); *G06F 11/3041* (2013.01); *G06F 21/602* (2013.01); *G06F 2009/45579* (2013.01); *G06F 2009/45587* (2013.01)

(58) Field of Classification Search
CPC .. G06F 21/566; G06F 9/45558; G06F 21/602; G06F 2009/45579; G06F 2009/45587
See application file for complete search history.

(56) References Cited

U.S. PATENT DOCUMENTS

| 8,261,085 | B1 * | 9/2012 | Fernandez | G06F 21/565 |
| | | | | 711/119 |
| 8,904,525 | B1 * | 12/2014 | Hodgman | G06F 21/562 |
| | | | | 726/22 |
| 8,949,825 | B1 * | 2/2015 | Fitzgerald | G06F 11/0712 |
| | | | | 718/1 |
| 9,251,343 | B1 * | 2/2016 | Vincent | G06F 21/566 |
| 9,679,134 | B1 * | 6/2017 | Jing | H04L 63/1408 |
| 9,690,937 | B1 * | 6/2017 | Duchin | G06F 21/562 |
| 10,025,691 | B1 * | 7/2018 | Ismael | G06F 21/44 |
| 11,057,423 | B2 * | 7/2021 | Giura | H04L 63/1458 |
| 11,204,776 | B2 * | 12/2021 | Kim | G06F 16/2365 |
| 2005/0132122 | A1 * | 6/2005 | Rozas | G06F 21/55 |
| | | | | 711/100 |

(Continued)

*Primary Examiner* — Jason Chiang (74) *Attorney, Agent, or Firm* — SU IP Consulting (57) ABSTRACT

A next generation antivirus (NGAV) security solution in a virtualized computing environment includes a security sensor at a virtual machine that runs on a host and a security engine remote from the host. The integrity of the NGAV security solution is increased, by providing a verification as to whether a verdict issued by the security engine has been successfully enforced by the security sensor to prevent execution of malicious code at the virtual machine.

21 Claims, 3 Drawing Sheets

(56) References Cited

U.S. PATENT DOCUMENTS

| | | | |
|---|---|---|---|
| 2008/0126779 A1* | 5/2008 | Smith | G06F 21/575 |
| | | | 713/2 |
| 2012/0173497 A1* | 7/2012 | Devalla | G06F 21/51 |
| | | | 707/698 |
| 2012/0291131 A1* | 11/2012 | Turkulainen | G06F 21/554 |
| | | | 726/24 |
| 2013/0263277 A1* | 10/2013 | Ely | G06F 21/78 |
| | | | 726/26 |
| 2013/0340077 A1* | 12/2013 | Salsamendi | G06F 21/554 |
| | | | 718/1 |
| 2015/0007175 A1* | 1/2015 | Potlapally | G06F 9/455 |
| | | | 718/1 |
| 2015/0089654 A1* | 3/2015 | Yu | G06F 21/568 |
| | | | 726/23 |
| 2015/0310188 A1* | 10/2015 | Ford | G06F 21/10 |
| | | | 726/28 |
| 2016/0004869 A1* | 1/2016 | Ismael | G06F 21/577 |
| | | | 726/1 |
| 2016/0182554 A1* | 6/2016 | Patteson | G06F 21/56 |
| | | | 726/25 |
| 2016/0342787 A1* | 11/2016 | Wang | G06F 21/566 |
| 2017/0124326 A1* | 5/2017 | Wailly | G06F 9/45558 |
| 2017/0149807 A1* | 5/2017 | Schilling | G06F 21/53 |
| 2017/0279826 A1* | 9/2017 | Mohanty | H04L 67/1004 |
| 2019/0207767 A1* | 7/2019 | Ahn | G06Q 20/065 |
| 2019/0278925 A1* | 9/2019 | Ely | G06F 21/64 |
| 2020/0019704 A1* | 1/2020 | Tora | G06F 21/567 |
| 2020/0097662 A1* | 3/2020 | Hufsmith | H04L 9/0643 |
| 2020/0195694 A1* | 6/2020 | Kalinin | G06Q 10/107 |
| 2021/0173929 A1* | 6/2021 | Dalvi | G06F 21/54 |
| 2021/0281420 A1* | 9/2021 | Szubbocsev | G06F 21/6218 |

\* cited by examiner

CLOUD-BASED METHOD TO INCREASE INTEGRITY OF A NEXT GENERATION ANTIVIRUS (NGAV) SECURITY SOLUTION IN A VIRTUALIZED COMPUTING ENVIRONMENT

RELATED APPLICATIONS

Benefit is claimed under 35 U.S.C. 119(a)-(d) to Foreign Application Serial No. 202041011229 filed in India entitled "CLOUD-BASED METHOD TO INCREASE INTEGRITY OF A NEXT GENERATION ANTIVIRUS (NGAV) SECURITY SOLUTION IN A VIRTUALIZED COMPUTING ENVIRONMENT", on Mar. 16, 2020, by VMware, Inc., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A virtualized computing environment having hosts that support VMs is often vulnerable to malware, ransomware, phishing, rootkits, viruses, or other types of malicious code. To protect against such malicious code, various security solutions have been implemented to detect the malicious code and to prevent or halt their execution. For example, next generation antivirus (NGAV) security solutions implement a cloud-based security engine that intervenes in the execution of malicious code inside of an endpoint (e.g., at a virtual machine). However, despite the benefits and advances provided by NGAV security solutions over traditional security solutions, NGAV security solutions and other security solutions sometimes do not adequately address a virtualized computing environment's vulnerabilities to malicious code.

For example, the security engine may issue a verdict to a security sensor (located at a VM) to instruct the security sensor to deny the execution of code located at the VM and which the security engine has determined to be malicious code. However, the malicious code could tamper with the verdict by impersonating system calls, application program interface (API) calls, etc. that deceive the security sensor and/or other elements of the VM into allowing (rather than denying) the execution, and the security engine would be unaware of a violation of the verdict.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks described above in NGAV security solutions and other types of security solutions wherein there is uncertainty as to whether a verdict from a security engine has been enforced. The embodiments described herein increases the integrity of a security solution by providing a method that verifies whether a verdict from a security engine has been enforced, so as to deny the execution of malicious code in a virtual machine in a virtualized computing environment.

According to an embodiment, a security sensor (deployed at a virtual machine that runs at a host) calculates a file cryptography hash value associated with code (such as an application) that is attempting to perform an operation, and sends the calculated file cryptography hash value to the security engine. Meanwhile, the security sensor also holds (e.g., pauses) the execution of the code while awaiting a verdict from the security engine. The security sensor also sends a file map associated with the code to the security engine. The security engine generates a verdict (e.g., allow or deny the execution of the code) depending on whether the calculated file cryptography hash value received from the security sensor matches a trusted file cryptography hash value. The security engine sends the verdict to the security sensor, and also sends the verdict and the file map to a host-level element (such as a host operating system or a hypervisor) of the host. If the verdict is to deny the execution of the code (due to the security engine having determined that the calculated file cryptography hash value does not match the trusted file cryptography hash value, and so the code is determined to be malicious code), then the security sensor should enforce the verdict by denying the execution of the code. To verify that the verdict has been enforced (e.g., to verify that the execution of the code has been denied by the security sensor), the host-level element at the host monitors input/output (I/O) activity associated with the file map. If the verdict is to deny the execution and the host-level element detects I/O activity associated with the file map, then these conditions are indicative that the verdict failed to be enforced (e.g., there is a violation of the verdict, since the code is attempting to execute), and so the host-level element performs a remediation action specified by the security engine.

Computing Environment

To further explain the operation of the security engine, security sensor, and other elements in cooperation with each other to provide verdicts and to enforce (and verify enforcement of) verdicts for a security solution, various implementations will now be explained in more detail using FIG. 1, which is a schematic diagram illustrating an example virtualized computing environment 100 that can implement a method to increase the integrity of a NGAV solution (or other security solution). Depending on the desired implementation, virtualized computing environment 100 may include additional and/or alternative components than that shown in FIG. 1.

Figure 1:
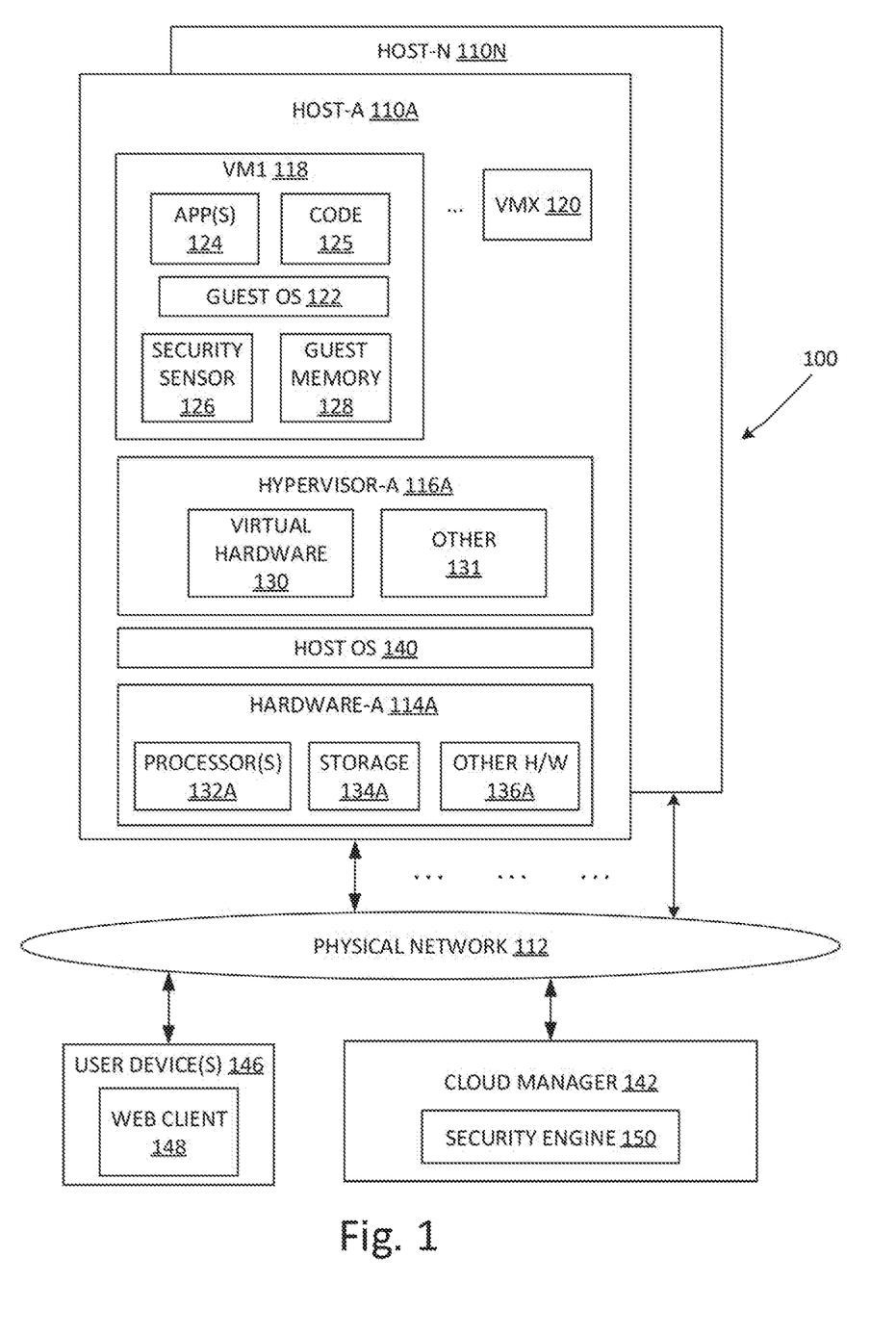
FIG. 1 is a schematic diagram illustrating an example virtualized computing environment that can implement a method to increase the integrity of a next generation antivirus (NGAV) security solution.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware 114A and virtualization software (e.g., hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may include code 125, which may be one or more of the applications 124 (or other type of trusted code) and/or may be malicious code—according to various embodiment, methods are provided herein to determine whether or not the code 125 includes malicious code, to issue a verdict to deny the execution of the malicious code, and to verify whether the verdict has been successfully enforced.

For use in the methods to determine whether the code 125 is malicious code, VM1 118 may include a security sensor 126 (for example, a type of in-guest agent). The security sensor 126 of various embodiments may be in the form of a daemon or other software/code that runs in a background process. The security sensor 126 may run as part of the guest OS 122 in one example implementation, or may be a separate element from the guest OS 122 in other example implementations. Further details of the features and operation of the security sensor 126 will be described later below with respect to FIGS. 2-3.

VM1 118 may also include a guest memory 128 for the guest OS 122 and/or for other storage purposes (such as for storing the security sensor 126, applications 124, code 125, and their associated files and data). VM1 118 may include still further other elements (not shown), such as a virtual disk and/or other elements usable in connection with operating VM1 118. The security sensor 126, code 125, etc. of one embodiment may be any suitable software program or other computer-readable instructions/code stored on a non-transitory computer-readable medium (such as the guest memory 128), and executable by one or more processors.

The hypervisor-A 116A may be a software layer or component that supports the execution of multiple virtualized computing instances. The hypervisor-A 116A may run on top of a host operating system 140 of the host-A 110A or may run directly on hardware 114A. The hypervisor-A 116A maintains a mapping between underlying hardware 114A and virtual resources (depicted as virtual hardware 130) allocated to VM1 118 and the other VMs. The hypervisor-A 116A may include or operate other elements or sub-elements (depicted generally at 131 in FIG. 1), such daemons, processes and sub-processes, agents, etc.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

A cloud manager 142 of one embodiment can take the form of a physical computer with functionality to manage or otherwise control the operation of host-A 110A . . . host-N 110N. In some embodiments, the functionality of the cloud manager 142 can be implemented in a virtual appliance, for example in the form of a single-purpose VM that may be run on one of the hosts in a cluster or on a host that is not in the cluster. The functionality of the cloud manager 142 may be accessed via one or more user devices 146 that are operated by a system administrator. For example, the user device 146 may include a web client 148 (such as a browser-based application) that provides a user interface operable by the system administrator to view and evaluate alerts or other information provided by the security sensor 126, the hypervisor-A 116A, and/or other elements of the host-A 110A to the cloud manager 142. The system administrator may then operate the user interface of the web client 148 to facilitate the implementation of a remediation action, such as shutting down a VM, disabling a guest OS, halting or otherwise preventing the execution of malicious code, further investigating an alert regarding potential malicious code, debugging, troubleshooting, etc.

According to one embodiment, the cloud manager 142 may include a security engine 150. The security engine 150, in conjunction with the security sensor 126 and other elements of the host-A 110A, can form part of a NGAV security solution for the virtualized computing environment 100. Further details about the features and operations of the security engine 150 will be described later below with respect to FIGS. 2-3.

The cloud manager 142 may be communicatively coupled to host-A 110A . . . host-N 110N (and hence communicatively coupled to the virtual machines, hypervisors, security sensors, hardware, etc.) via the physical network 112. The host-A 110A . . . host-N 110N may in turn be configured as a datacenter that is managed by the cloud manager 142, and the datacenter may support a web site. In some embodiments, the functionality of the cloud manager 142 may be implemented in any of host-A 110A . . . host-N 110N, instead of being provided as a separate standalone device such as depicted in FIG. 1.

Depending on various implementations, one or more of the physical network 112, the cloud manager 142, and the user device(s) 146 can comprise parts of the virtualized computing environment 100, or one or more of these elements can be external to the virtualized computing environment 100 and configured to be communicatively coupled to the virtualized computing environment 100.

Security and Verdict Verification Processes

Figure 2:
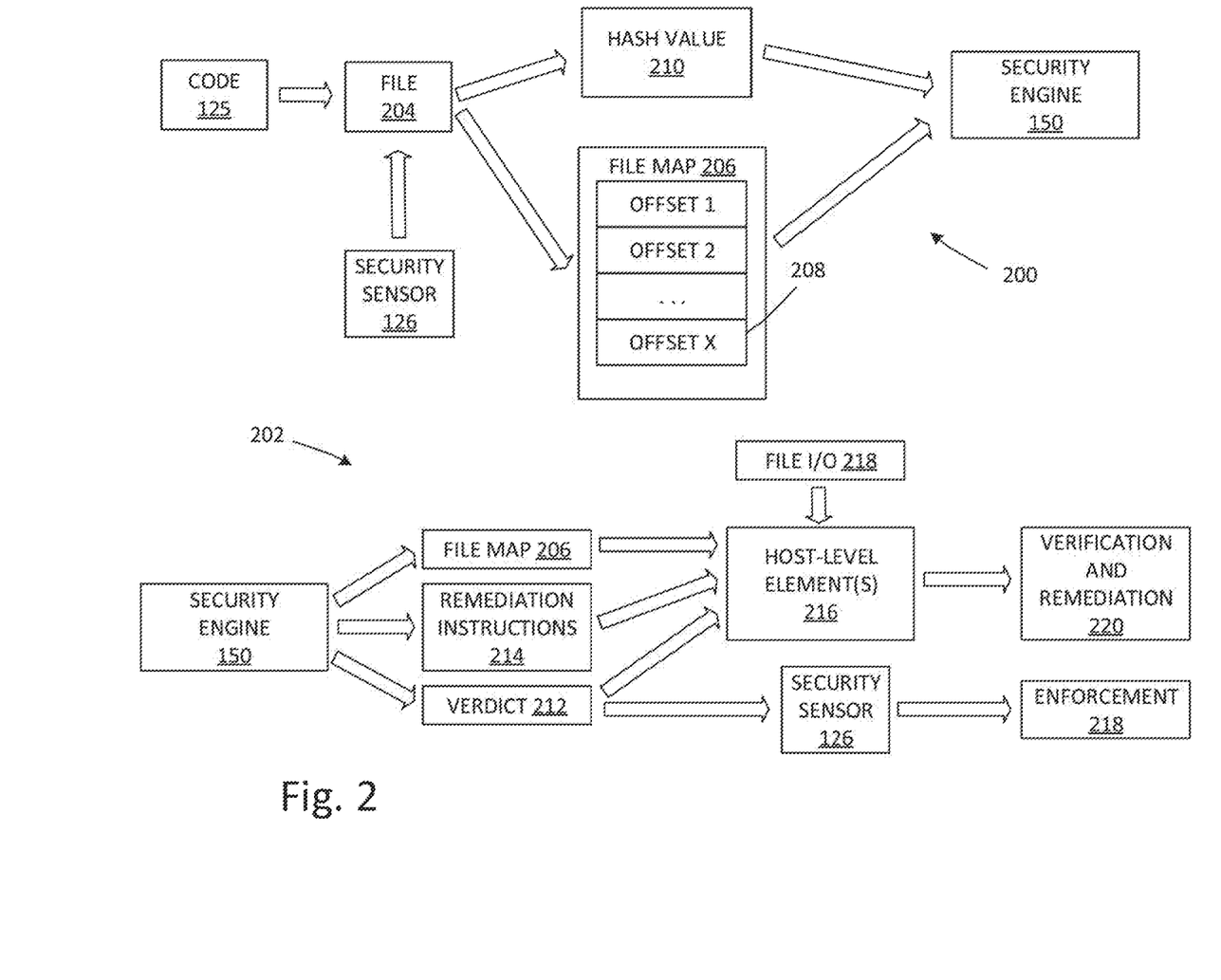
FIG. 2 shows diagrams illustrating elements that may cooperate with each other to increase the integrity of the NGAV security solution, by generating a verdict and verifying whether the verdict has been enforced in the virtualized computing environment of FIG. 1.

FIG. 2 shows diagrams illustrating elements that may cooperate with each other to increase the integrity of the NGAV security solution, by generating a verdict and verifying whether the verdict has been enforced in the virtualized computing environment 100 of FIG. 1. Specifically, a diagram 200 represents a process and corresponding elements that may be used to generate a verdict, while a diagram 202 represents a process and corresponding elements that may be used to enforce the verdict and to verify that the verdict has been enforced. The various arrows in FIG. 2 may represent an input/output flow of data/instructions from an element to another element, may represent relationships between elements, or may represent operations being performed by an element on another element.

Referring first to the diagram 200, the code 125 may be valid/trusted code or malicious code, which is attempting to execute in order to perform a process, task, operation, or other file event. Examples of such file events are open, close-after-write, etc. The NGAV security solution will need to determine whether to permit the execution to occur. For instance, the NGAV security solution will allow the execution of the code 125, if the code 125 is determined by the NGAV security solution to be valid/trusted code. On the other hand, the NGAV security solution will deny the execution of the code 125, if the code 125 is determined by the NGAV security solution to be malicious code. In another scenario, the NGAV security solution may not make a determination at the onset as to whether the code 125 is trusted/valid or malicious, but will instead permit the code 125 to partially execute and then determine from the results of the execution as to whether the code 125 is valid/trusted or malicious.

The code 125 is embodied in or otherwise corresponds to a file 204. For example, the file 204 may be a binary file or other type of executable file format. According to some example implementations, the file 204 may be stored in memory (e.g., stored in one or more of the guest memory 128, other virtual memory, physical memory, etc. or combinations thereof). A file map 206 (maintained by the guest OS 122) may represent the storage of the file 204 in one or memories, wherein the storage locations of various portions of the file 204 may be identified by the file map 206 through a plurality of offsets 208. The offsets 208 may represent file offsets (e.g., address locations) in a single virtual memory or single physical memory that stores the portions of the file 204, and/or the offsets 208 may represent disk offsets when multiple virtual memories or multiple physical memories are used to store the portions of the file 204.

When the code 125 (file 204) attempts/begins to execute, the security sensor 126 detects/identifies the attempt to execute and pauses (or otherwise holds) the execution, so as to await a determination (e.g., a verdict) from the security engine 150 as to whether the code 125 is valid/trusted or malicious. For this determination, the security sensor 126 applies a hash function to the file 204 in order to calculate a file cryptography hash value 210 that uniquely identifies or otherwise corresponds to the code 125 (file 204). Each file will correspond to a different hash value that uniquely identifies the file. Thus, each of the trusted/valid applications 124 will have a different value, maliciously modified versions of the applications 124 will each have a different hash value, malicious programs (e.g., malicious code) will each have a different hash value, etc. Examples of hash functions that may be used by the security sensor 126 include MD-5, SHA-256, and various others. The security sensor 126 then sends the hash value 210 to the security engine 150.

The security engine 150 in turn compares the hash value 210 (received from the security sensor 126) with a whitelist of trusted file cryptography hash values that represent valid/trusted code. The whitelist may be stored information maintained at the cloud manager 142 and/or may be information stored remotely from the cloud manager 142 and obtainable by the cloud manager 142. If there is a match between the hash value 210 and a trusted hash value on the whitelist, then the security engine 150 determines that the code 125 is valid/trusted. If there is no match (e.g., a mismatch) between the hash value 210 and the hash values on the whitelist, then the security engine 150 determines that the code 125 is malicious code.

In addition to the hash value 210, the security sensor 126 also sends the file map 206 of the file 204 to the security engine 150. As will be described next below with respect to the diagram 202, the security engine 150 may provide the file map 206 along with a verdict 212 to the host-A 110A for purposes of enforcing the verdict 212 and verification of enforcement.

Referring specifically to the diagram 202, the security engine 150 determines from the hash value 210 whether the code 125 is malicious—specifically, the security engine 150 generates the verdict 212 based on whether there is a match or mismatch between the hash value 210 and hash value(s) in the whitelist. The security engine 150 then sends the verdict 212 to the security sensor 126 for enforcement at 218. An example verdict may be an ACCEPT verdict that instructs the security sensor 126 to permit the code 125 to execute, due to a match between the hash values thereby indicating that the code 125 is valid/trusted code. Another example verdict may be a DENY verdict that instructs the security sensor 126 to stop the execution of the code 125, due to a mismatch between the hash values thereby indicating that the code 125 is malicious code.

In some implementations, the security engine 150 may issue a PENDING verdict or some other indication to the security sensor 126 that a final ACCEPT or DENY verdict has not yet been determined. For example, the security engine 150 may be unable to determine with a sufficient confidence level whether the code 125 is malicious or non-malicious. Hence, the PENDING verdict may instruct the security sensor 126 to permit the code 125 to at least partially execute in quarantined environment or other type of isolated environment that can be closely monitored by a system administrator at the user device 146. Depending on whether the results of such execution are indicative of malicious or non-malicious code, the system administrator can allow or deny the full completion of execution of the code 125.

In addition to sending the verdict 212 to the security sensor 126, the security engine 150 also sends the verdict 212 to one or more host-level elements 216 of the host-A 110A, such as the hypervisor-A 116-A and/or the host OS 140 or sub-elements or sub-processes thereof. The one or more host-level elements 216 encompass components and processes that execute in the host (e.g., run in the host-A 110A) but outside of the virtual machines (e.g., execute outside of VM1 118 and the other VMs supported by host-A 110). Therefore, while a virtual machine itself may be corrupted by malicious code, the host OS, hypervisor, and other host-level elements 216 are trusted elements that operate outside of the virtual machines. As such (due to such separation/isolation and higher privilege/trust level of the host-level elements 216), these host-level elements 216 are able to perform (a) monitoring for malicious code in the virtual machines and (b) remediation to address malicious code, without the host-level elements 216 being themselves corrupted by the malicious code that is present in the virtual machine.

The security engine 150 also sends the file map 206 and one or more remediation instructions 214 to the element(s) 216. Sending the verdict 212, the file map 206, and the remediation instructions 214 to the element(s) 216 enables the NGAV security solution to verify whether enforcement occurred at 218, and therefore addresses the drawbacks previously described above wherein tampering may permit malicious code to execute despite a DENY verdict issued by a security engine.

For example, the security engine 150 may issue a DENY verdict, but malicious code may intercept the verdict at the VM1 118 before the verdict reaches the security sensor 126 and then may tamper with the verdict to change the DENY verdict to an ACCEPT verdict. Thus, the security sensor 126 may improperly permit the code 125 to execute. Other possible tampering scenarios may involve malicious code issuing system calls, APIs, or other instructions/communications (to the guest OS 122 and/or to other elements of the VM1 118) that override, bypass, or impersonate communications from the security sensor 126 thereby permitting the code 125 to execute, despite the security sensor 126 having received a DENY verdict from the security engine 150 and attempting to enforce the DENY verdict, Therefore, by also sending the verdict 212 to the element(s) 216, which are trusted elements at a hypervisor level and/or host OS level that is isolated from malicious code in the VM1 118, a valid (un-tampered and pristine) verdict is received by the host-A 110A for reference, despite tampering that may occur inside of the VM1 118.

With respect to the file map 206 and the remediation instructions 214 received by the element(s) 216 from the security engine 150, the file map 206 and the remediation instructions 214 (in combination with the verdict 212 received by the element(s) 216) also enable a verification and remediation process 220 that addresses potential tampering that may occur in VM1 118 to attempt to execute malicious code. For example, if the verdict 212 received by the element(s) 216 is a DENY verdict, then the element(s) 216 will know that the code 125 is malicious code and should not be permitted to execute.

Then, the element(s) 216 captures or otherwise intercepts file I/O activity 218 performed on the file 204. By monitoring for file I/O activity 218 on the storage location(s) indicated in the file map 206, the element(s) 216 can determine whether the code 125 is attempting to execute. For example, the element(s) 216 may monitor for I/O activity directed to each of the file offsets in the file map 206. When the verdict 212 is a DENY verdict, the absence of detected I/O activity 218 is indicative that the security sensor 126 has successfully enforced the verdict 212 to deny execution of the code 125, and so the element(s) 216 verifies enforcement of the verdict 212 at 220.

However, the detected presence of the I/O activity 218 (in the presence of a DENY verdict received by the element(s) 216) may be indicative of tampering and of the code 125 executing or attempting to execute, and so the element(s) 216 verifies at 220 that the verdict 212 has not been enforced. Under such circumstances where there is a violation of the verdict 212, the element(s) 216 may consult the remediation instructions 214 to determine a remediation action.

Examples of the remediation actions that may be performed by the element(s) 216 at 220 may include: sending an alert to the security engine 150, if the corresponding remediation instruction is SEND ALERT; terminating execution of the code 125, by blocking the I/O activity 218, if the corresponding remediation action is BLOCK; or other remediation action to (a) prevent the execution of the code 125 so as to avoid potential harm to the VM1 118 and/or (b) send a notification to the security engine 150 so as to enable a system administrator to further investigate the situation and determine further appropriate remediation action(s).

Figure 3:
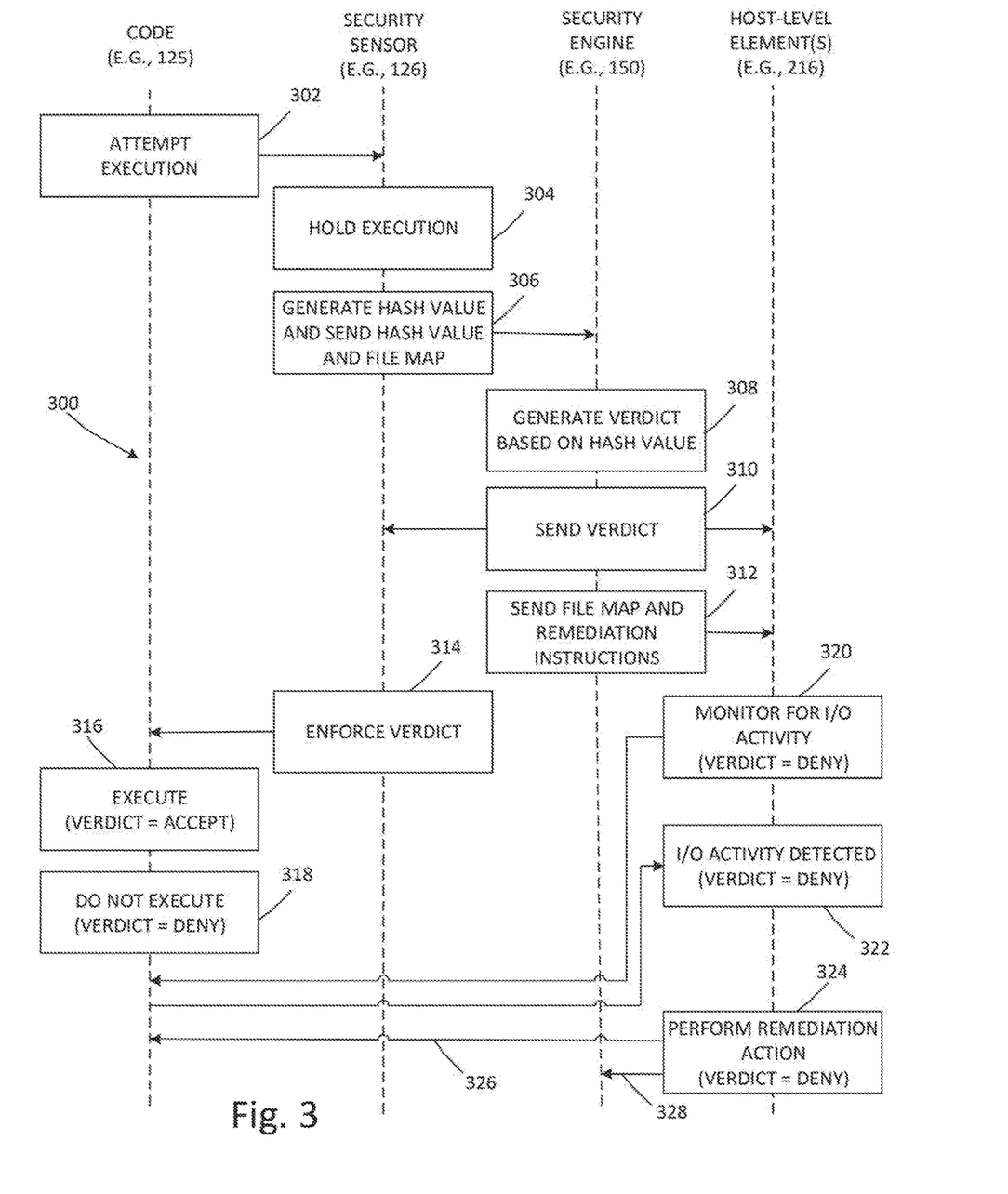
FIG. 3 is a flowchart of an example method for the virtualized computing environment of FIG. 1 to operate a NGAV security solution.

Further details about increasing the integrity of a security solution are described next with respect to FIG. 3. Specifically, FIG. 3 is a flowchart of an example method 300 for the virtualized computing environment 100 of FIG. 1 to operate a NGAV security solution. The example method 300 may include one or more operations, functions, or actions illustrated by one or more blocks, such as blocks 302 to 324. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

At a block 302 ("ATTEMPT EXECUTION"), the code 125 attempts to begin executing. At this point in time, the security solution may not know whether the code 125 is trusted/valid code or malicious code. Therefore at a block 304 ("HOLD EXECUTION"), the security sensor 126 holds or otherwise pauses the execution of the file 204 (e.g., a binary file) pending receipt of a verdict from the security engine 150.

At a block 306 ("GENERATE HASH VALUE AND SEND HASH VALUE AND FILE MAP"), the security sensor 126 applies a file cryptographic hash function to the file 204 to generate the file cryptographic hash value 210, and sends the generated hash value 210 to the remotely located security engine 150. Also at the block 306, the security sensor 126 sends the file map 206 corresponding to the file 204 (the code 125) to the security engine 150.

The security engine 150 receives the hash value 210 from the security sensor 126 and compares the hash value 210 to the whitelist of valid/trusted hash values. Based on the results of this comparison, the security engine 150 generates the verdict 212 at a block 308 ("GENERATE VERDICT BASED ON HASH VALUE"). The verdict 212 may be an ACCEPT verdict (which will permit execution of the code 125 as trusted/valid code), if the security engine 150 is able to locate a matching hash value in the whitelist. The verdict 212 may be a DENY verdict (which will attempt to deny execution of the code 125 as malicious code), if the security engine 150 is unable to locate a matching hash value in the whitelist.

At a block 310 ("SEND VERDICT"), the security engine 150 sends the generated verdict 212 to the security sensor 126 and also to the host-level element(s) 216 at the host-A 116A. The security engine 150 also sends the file map 206 and the remediation instructions 216 to the element(s) 216, at a block 312 ("SEND FILE MAP AND REMEDIATION INSTRUCTIONS"). According to one embodiment, the element(s) 216 that receives the verdict 212, file map 206, and remediation instructions 216 from the security engine 150 may be a host world daemon that runs in the hypervisor-A 116A and/or in the host OS 140. The host world daemon may then pass the verdict 212, file map 206, and remediation instructions 216 to a user (guest) world process or daemon (e.g., another one of the host-level element(s) 216) that runs in the hypervisor-A 116A and that is associated with the VM1 118 where the code 125 resides.

At a block 314 ("ENFORCE VERDICT"), the security sensor 126 receives the verdict 212 from the security engine 150 and attempts to enforce the verdict 212 against the code 125. For example, if the verdict 212 is an ACCEPT verdict, then the security engine 150 has determined that the code 125 is valid/trusted code and can be permitted to execute. The security sensor 126 therefore releases (e.g., authorizes) the execution of the code 125 that was being held, and the execution of the code 125 occurs at a block 316 ("EXECUTE").

However, if the verdict 212 is a DENY verdict, then the security engine 150 has determined that the code 125 is malicious code and cannot be permitted to execute. The security sensor 126 therefore continues to hold execution or otherwise ends any attempt by the code 125 to execute, and the code 125 is successfully prevented from execution at a block 318 ("DO NOT EXECUTE"), assuming that no malicious tampering has occurred.

In view of the possibility of tampering that may permit the code 125 to execute, even though the security engine 150 has determined that the code 125 is malicious code and has issued a DENY verdict, the element(s) 216 (such as the user world process/daemon) monitors for I/O activity 218 at a block 320 ("MONITOR FOR I/O ACTIVITY"). For example, the user world process/daemon monitors for and captures I/O activity 218 for the storage locations indicated in the file map 206 of the code 125 (file 204). For example, the user world process/daemon monitors for read/write accesses between persistent memory locations where the code 125 resides and non-persistent memory locations where a guest processor may execute the code. If no such I/O activity 218 is detected by the user world process/daemon at the block 320, then such a condition indicates that the DENY verdict has been successfully enforced at the block 318.

In more detail regarding an example scenario involving malicious code and I/O activity, malicious code may be present in a virtual machine in the form of a binary file (e.g., the file 204 or other executable file). The malicious code (e.g., pieces of the code in the binary file) may reside throughout the memory system in the virtual machine (e.g., are stored in the guest memory 128), with these persistent storage locations being identified by the file map 206. If the malicious code attempts to execute, portions of the malicious code need to be copied/read from their persistent storage locations (e.g., read by the guest OS 122 or other component of the virtual machine), and then stored into random access memory (RAM) or other non-persistent memory where the guest processor in the virtual machine can execute the code. The attempt to transfer a copy of the code, from the persistent storage location to RAM, represents an example of an output (O) activity that is captured at block 320 and that is used to determine that the malicious code is attempting to execute.

Attempts by the guest OS 122 (or other component of the virtual machine) to return values to the code in the persistent memory locations, to request copies of code from the persistent memory locations, to write to the persistent memory locations where the code resides, etc. are examples of input (I) activities that are also captured and that are also used to determine that the malicious code is attempting to execute.

For code that may already be running/executing, I/O activity may also be generated due to the page-in and page-out operations performed by the guest OS 122. Furthermore for code that is already running, metadata like access time to the guest memory 128, RAM etc. is updated. The host-level element(s) 216 may use this metadata update activity to detect whether the denied executable/code is running or not. Such examples of I/O activity for running code can be monitored/captured at the block 320.

If the user world process/daemon detects the I/O activity 218 at a block 322 ("I/O ACTIVITY DETECTED"), then such a condition indicates that the DENY verdict has failed to be enforced and the code 125 is attempting to execute. The user world/daemon therefore performs a remediation action specified in the remediation instructions 214, at a block 324 ("PERFORM REMEDIATION ACTION"). For example, if the remediation instruction in response to a violation of the verdict 212 (DENY verdict) requires stopping the execution of the code, then the user world process/daemon blocks the I/O activity 218 or otherwise disables the code 125, as shown at 326. As another example, if the remediation instruction in response to a violation of the verdict 212 (DENY verdict) requires sending a notification, then the user world process/daemon generates and sends a notification of the violation to the security engine 150 for further analysis by a system administrator, as shown at 328.

While the various embodiments described above involve processes wherein the element(s) 216 monitor for violations of the verdict 212 (DENY verdict) and performs a remediation action such as sending a notification for the violations of the DENY verdict, other embodiments may monitor for other conditions and may send other types of notifications. For example and in addition to monitoring for violations of DENY verdicts and providing notifications of such violations, other embodiments may provide notifications to the security engine 150 when verdicts have been successfully enforced. For instance, if the verdict 212 is an ACCEPT verdict and the code 125 has successfully executed, the element(s) 216 may send a notification to the security engine 150 that the code 125 has executed. Similarly, if the verdict 212 is a DENY verdict and the code 125 has been successfully denied execution, the element(s) 216 may send a notification of the successful denial to the security engine 150, rather than just sending a notification when there is a failed denial.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 2-3. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to verify whether verdicts from security engines have been enforced to deny the execution of malicious code.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method to operate a security solution in a virtualized computing environment that includes a host and a virtual machine that runs on the host, the method comprising:
    identifying, by a security sensor at the virtual machine, an attempt to execute code in the virtual machine;
    generating, by the security sensor, a hash value corresponding to the code;
    sending, by the security sensor to a security engine remote from the host, the generated hash value and a file map that corresponds to the code;
    receiving, by the security sensor from the security engine, a verdict that instructs the security sensor to deny execution of the code based on the security engine having determined from the hash value that the code is malicious;
    receiving, by at least one host-level element of the host from the security engine, the verdict and the file map, wherein the at least one host-level element executes in the host and outside of the virtual machine; and
    verifying, by the at least one host-level element based on the verdict and on input/output (I/O) activity associated with the file map, whether the security sensor has successfully enforced the verdict to deny execution of the code.

2. The method of claim 1, wherein the at least one host-level element includes a hypervisor, a host operating system, a sub-process of the hypervisor or host operating system, or a sub-element of the hypervisor or host operating system.

3. The method of claim 1, wherein verifying whether the security system has successfully enforced the verdict includes determining, by the at least one host-level element, that the security sensor has successfully enforced the verdict, due to the at least one host-level element having detected an absence of the I/O activity.

4. The method of claim 1, wherein verifying whether the security system has successfully enforced the verdict includes determining, by the at least one host-level element, that the security sensor has failed to enforce the verdict, due to the at least one host-level element having detected a presence of the I/O activity.

5. The method of claim 4, further comprising:
    receiving, by the at least one host-level element from the security engine, at least one remediation instruction along with the verdict and the file map; and
    in response to verifying that the security sensor has failed to enforce the verdict, performing, by the at least one host level element, a remediation action specified by the remediation instruction.

6. The method of claim 5, wherein performing the remediation action includes blocking, by the at least one host-level element, the I/O activity so as to prevent execution of the code.

7. The method of claim 5, wherein performing the remediation action includes sending, by the at least one host-level element to the security engine, an alert that notifies the security engine of a violation of the verdict.

8. A non-transitory computer-readable medium having instructions stored thereon, which in response to execution by one or more processors, cause the one or more processors to perform or control performance of operations for a security solution in a virtualized computing environment that includes a host and a virtual machine that runs on the host, the operations comprising:
   identifying, by a security sensor at the virtual machine, an attempt to execute code in the virtual machine;
   generating, by the security sensor, a hash value corresponding to the code;
   sending, by the security sensor to a security engine remote from the host, the generated hash value and a file map that corresponds to the code;
   receiving, by the security sensor from the security engine, a verdict that instructs the security sensor to deny execution of the code based on the security engine having determined from the hash value that the code is malicious;
   receiving, by at least one host-level element of the host from the security engine, the verdict and the file map, wherein the at least one host-level element executes in the host and outside of the virtual machine; and
   verifying, by the at least one host-level element based on the verdict and on input/output (I/O) activity associated with the file map, whether the security sensor has successfully enforced the verdict to deny execution of the code.

9. The non-transitory computer-readable medium of claim 8, wherein the at least one host-level element includes a hypervisor, a host operating system, a sub-process of the hypervisor or host operating system, or a sub-element of the hypervisor or host operating system.

10. The non-transitory computer-readable medium of claim 8, wherein verifying whether the security system has successfully enforced the verdict includes determining, by the at least one host-level element, that the security sensor has successfully enforced the verdict, due to the at least one host-level element having detected an absence of the I/O activity.

11. The non-transitory computer-readable medium of claim 8, wherein verifying whether the security system has successfully enforced the verdict includes determining, by the at least one host-level element, that the security sensor has failed to enforce the verdict, due to the at least one host-level element having detected a presence of the I/O activity.

12. The non-transitory computer-readable medium of claim 11, wherein the operations further comprise:
   receiving, by the at least one host-level element from the security engine, at least one remediation instruction along with the verdict and the file map; and
   in response to verifying that the security sensor has failed to enforce the verdict, performing, by the at least one host level element, a remediation action specified by the remediation instruction.

13. The non-transitory computer-readable medium of claim 12, wherein performing the remediation action includes blocking, by the at least one host-level element, the I/O activity so as to prevent execution of the code.

14. The non-transitory computer-readable medium of claim 12, wherein performing the remediation action includes sending, by the at least one host-level element to the security engine, an alert that notifies the security engine of a violation of the verdict.

15. A host in a virtualized computing environment, the host comprising:
   a virtual machine that runs on the host;
   a processor; and
   a non-transitory computer-readable medium coupled to the processor and having instructions stored thereon, which in response to execution by the processor, cause the processor to perform or control performance of operations for a security solution in the virtualized computing environment, wherein the operations include:
      identify, by a security sensor at the virtual machine, an attempt to execute code in the virtual machine;
      generate, by the security sensor, a hash value corresponding to the code;
      send, by the security sensor to a security engine remote from the host, the generated hash value and a file map that corresponds to the code;
      receive, by the security sensor from the security engine, a verdict that instructs the security sensor to deny execution of the code based on the security engine having determined from the hash value that the code is malicious;
      receive, by at least one host-level element of the host from the security engine, the verdict and the file map, wherein the at least one host-level element executes in the host and outside of the virtual machine; and
      verify by the at least one host-level element based on the verdict and on input/output (I/O) activity associated with the file map, whether the security sensor has successfully enforced the verdict to deny execution of the code.

16. The host of claim 15, wherein the at least one host-level element includes a hypervisor, a host operating system, a sub-process of the hypervisor or host operating system, or a sub-element of the hypervisor or host operating system.

17. The host of claim 15, wherein the operation to verify whether the security system has successfully enforced the verdict includes an operation to:
   determine, by the at least one host-level element, that the security sensor has successfully enforced the verdict, due to the at least one host-level element having detected an absence of the I/O activity.

18. The host of claim 15, wherein the operation to verify whether the security system has successfully enforced the verdict includes an operation to:
   determine, by the at least one host-level element, that the security sensor has failed to enforce the verdict, due to the at least one host-level element having detected a presence of the I/O activity.

19. The host of claim 18, wherein the operations further include:
   receive, by the at least one host-level element from the security engine, at least one remediation instruction along with the verdict and the file map; and
   in response to verification that the security sensor has failed to enforce the verdict, perform, by the at least one host level element, a remediation action specified by the remediation instruction.

20. The host of claim 19, wherein the operation to perform the remediation action includes an operation to:
 block, by the at least one host-level element, the I/O activity so as to prevent execution of the code.

21. The host of claim 19, wherein the operation to perform the remediation action includes an operation to:
 send, by the at least one host-level element to the security engine, an alert that notifies the security engine of a violation of the verdict.

* * * * *